United States Patent
Urac et al.

(10) Patent No.: US 12,297,908 B2
(45) Date of Patent: May 13, 2025

(54) SEAL FOR AN AIRCRAFT ENGINE

(71) Applicant: PRATT & WHITNEY CANADA CORP., Longueuil (CA)

(72) Inventors: Tibor Urac, Mississauga (CA); Sébastien Bergeron, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 253 days.

(21) Appl. No.: 17/806,185

(22) Filed: Jun. 9, 2022

(65) Prior Publication Data

US 2023/0399982 A1 Dec. 14, 2023

(51) Int. Cl.
*F16J 15/08* (2006.01)
*F01D 11/00* (2006.01)
*F02C 7/28* (2006.01)

(52) U.S. Cl.
CPC ......... *F16J 15/0887* (2013.01); *F01D 11/003* (2013.01); *F02C 7/28* (2013.01); *F05D 2240/55* (2013.01)

(58) Field of Classification Search
CPC ... F16J 15/0887; F01D 11/003; F01D 11/005; F05D 2240/55; F05D 2240/57; F05D 2240/59; F02C 7/28
See application file for complete search history.

(56) References Cited

U.S. PATENT DOCUMENTS

| | | | |
|---|---|---|---|
| 6,299,178 B1 * | 10/2001 | Halling | F16J 15/0887 277/654 |
| 6,984,106 B2 | 1/2006 | Thompson | |
| 7,201,381 B2 | 4/2007 | Halling | |
| 8,661,828 B2 * | 3/2014 | Pieussergues | F02C 7/28 60/753 |
| 8,662,502 B2 * | 3/2014 | Stoia | F23R 3/283 277/572 |
| 9,169,930 B2 * | 10/2015 | Panchal | F01D 9/023 |

(Continued)

FOREIGN PATENT DOCUMENTS

| | | |
|---|---|---|
| DE | 1978062 | 2/1968 |
| DE | 102010037844 | 4/2011 |

(Continued)

*Primary Examiner* — Nicholas L Foster
(74) *Attorney, Agent, or Firm* — NORTON ROSE FULBRIGHT CANADA LLP

(57) ABSTRACT

A seal for an aircraft engine includes an annular body receivable in interference fit in a radial spacing defined between inner and outer cylindrical components of the aircraft engine, the annular body defining a central axis coaxial with the inner and outer cylindrical components, the annular body including an inner portion defining an inner diameter, an outer portion defining an outer diameter, and an intermediate portion extending between the inner and outer portions. The outer portion is slidably engageable to the outer cylindrical component at an outer contact sealing portion of the annular body. One of the inner portion and the outer portion defines at least one cut extending from the one of the inner portion and the outer portion toward another one of the inner portion and the outer portion. A method for sealing a radial spacing between coaxial cylindrical components in an aircraft engine is also described.

18 Claims, 6 Drawing Sheets

(56) References Cited

U.S. PATENT DOCUMENTS

| | | | |
|---|---|---|---|
| 9,957,827 B2* | 5/2018 | Davis | F01D 11/005 |
| 10,487,943 B2* | 11/2019 | Davis | F16J 15/0887 |
| 10,948,014 B2 | 3/2021 | Garrison | |
| 11,028,706 B2 | 6/2021 | McCormick | |
| 11,248,705 B2 | 2/2022 | Sarawate et al. | |
| 11,878,807 B2* | 1/2024 | Reller | F16J 15/3216 |
| 2006/0012133 A1* | 1/2006 | Strait | F16J 15/0887 |
| | | | 277/628 |
| 2007/0149031 A1 | 6/2007 | Martin et al. | |
| 2011/0179798 A1* | 7/2011 | Pieussergues | F02C 7/28 |
| | | | 277/650 |
| 2014/0125014 A1 | 5/2014 | Panchal et al. | |
| 2016/0115811 A1* | 4/2016 | Davis | F01D 11/005 |
| | | | 277/591 |
| 2017/0284210 A1 | 10/2017 | Bartley et al. | |
| 2018/0017168 A1* | 1/2018 | Davis | F01D 11/005 |
| 2020/0141256 A1* | 5/2020 | Broomer | F01D 25/246 |
| 2021/0347493 A1* | 11/2021 | Reller | B64D 29/04 |
| 2023/0071902 A1 | 3/2023 | Maalouf | |
| 2023/0399982 A1 | 12/2023 | Urac et al. | |

FOREIGN PATENT DOCUMENTS

| | | |
|---|---|---|
| EP | 2520766 | 11/2012 |
| EP | 3284913 | 2/2018 |
| JP | S61164862 | 10/1986 |

* cited by examiner

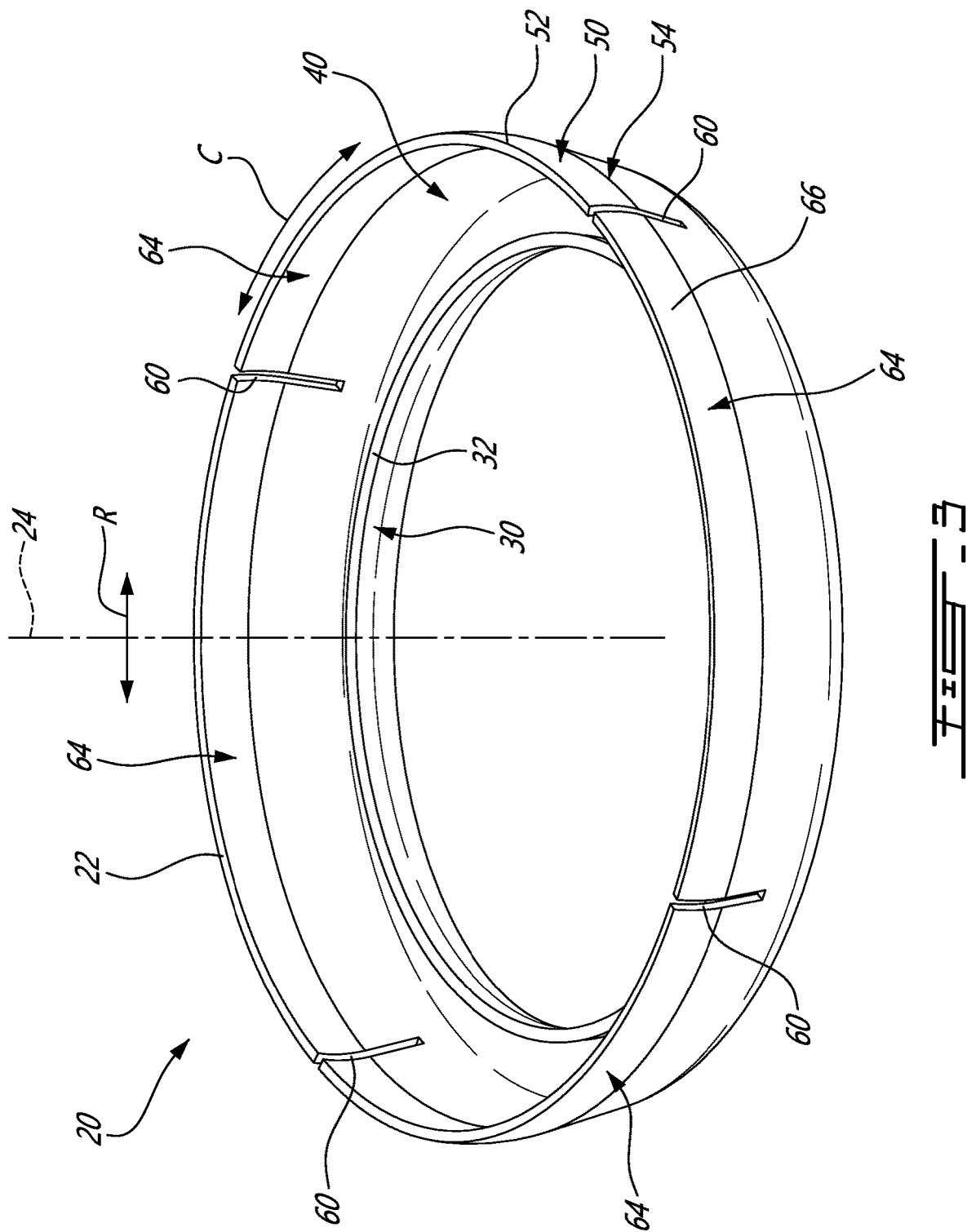

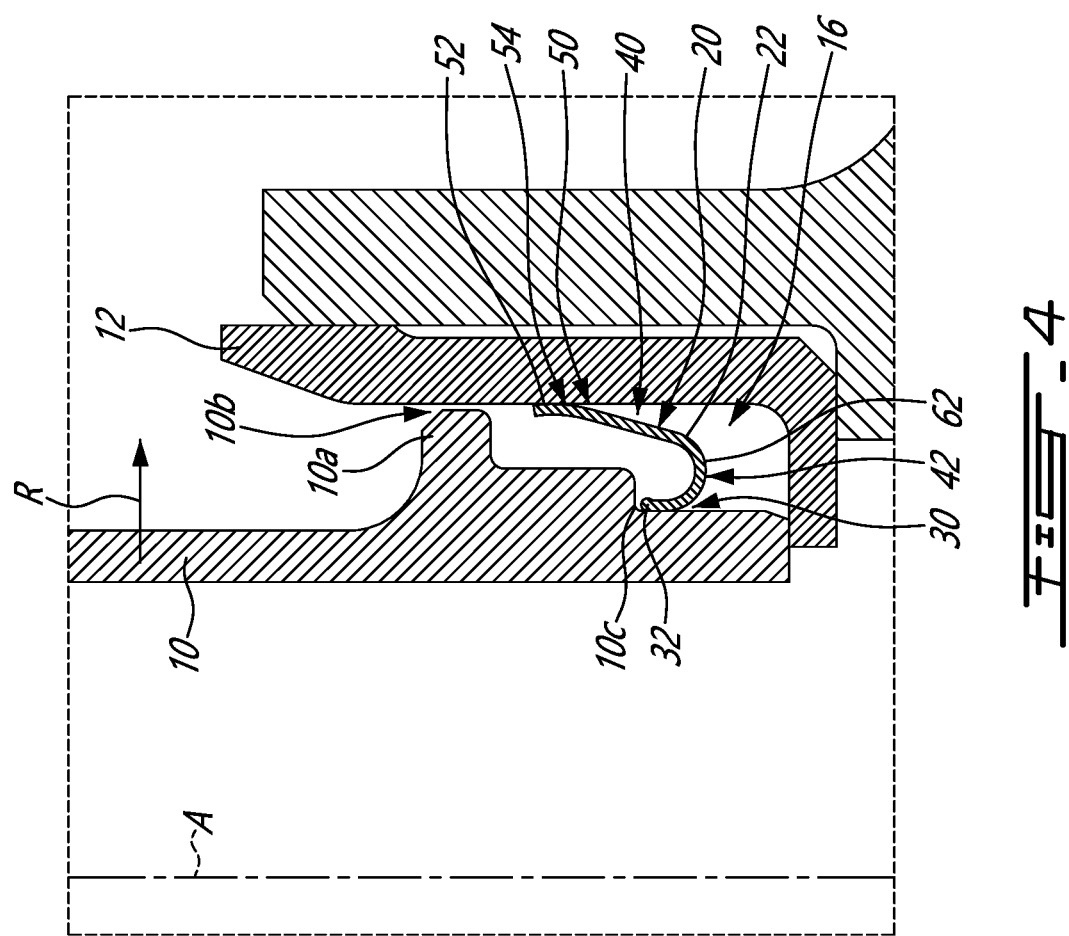

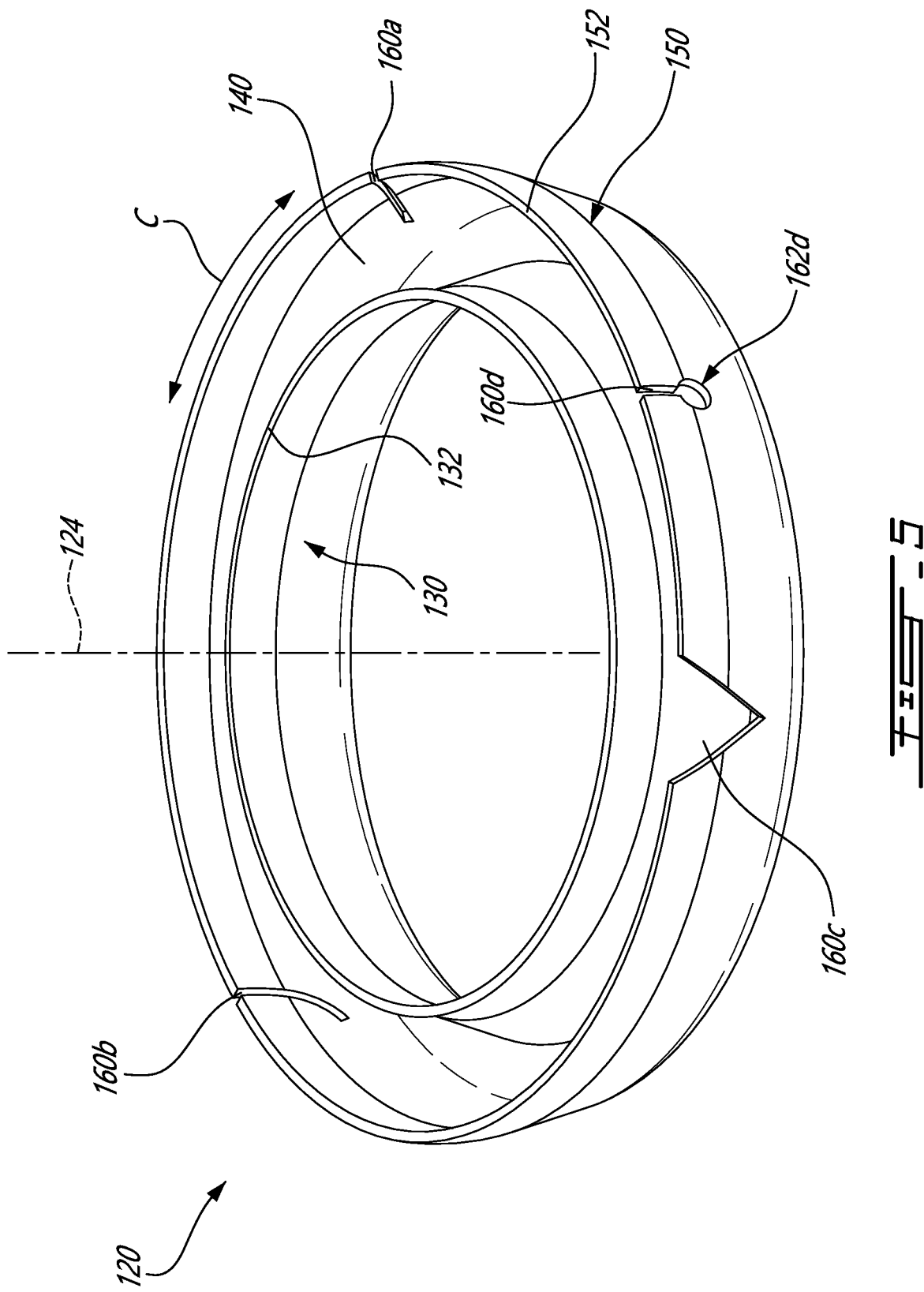

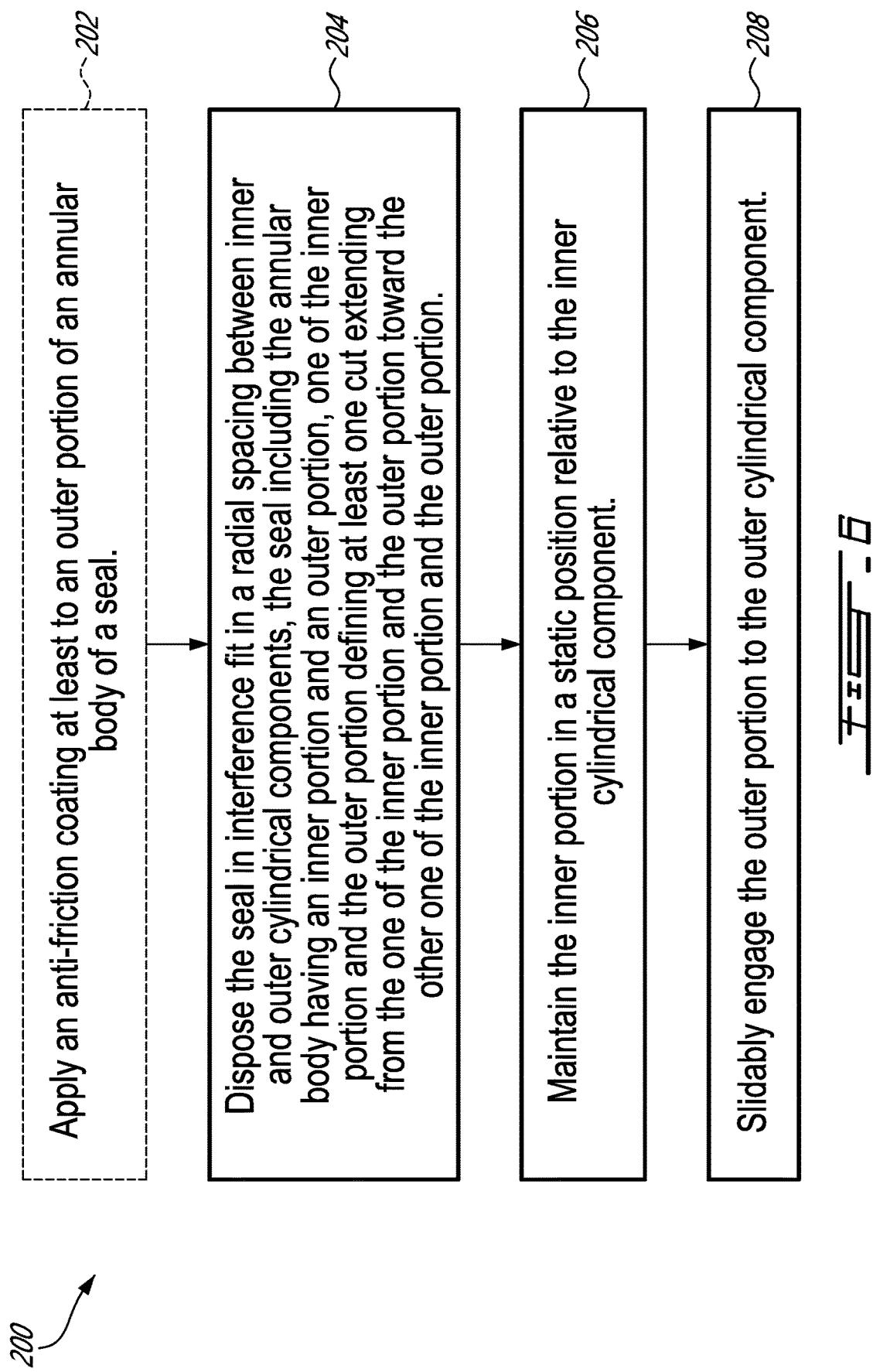

SEAL FOR AN AIRCRAFT ENGINE

TECHNICAL FIELD

The application relates to seals for aircraft engines.

BACKGROUND OF THE ART

The present disclosure relates generally to seals for use in a hot air system of an aircraft engine. Such seals are used in high temperature environments that are beyond the capabilities of a O-ring.

The seal is disposed between adjacent components of the hot air system. It has been found that it is difficult to adjust the balance between the sealing effect provided by the seal and the service life of the seal.

Therefore, while prior art seals are suitable for their intended purposes, improvements can be made.

SUMMARY

In one aspect, there is provided a seal for an aircraft engine including an annular body receivable in interference fit in a radial spacing defined between inner and outer cylindrical components of the aircraft engine, the annular body defining a central axis coaxial with the inner and outer cylindrical components, the annular body including an inner portion defining an inner diameter, an outer portion defining an outer diameter, and an intermediate portion extending between the inner and outer portions, the outer portion being slidably engageable to the outer cylindrical component at an outer contact sealing portion of the annular body, and one of the inner portion and the outer portion defining at least one cut extending from the one of the inner portion and the outer portion toward another one of the inner portion and the outer portion.

In some embodiments, the outer contact sealing portion of the annular body is defined at least by the outer portion.

In some embodiments, the at least one cut extends radially from the one of the inner portion and the outer portion toward the other one of the inner portion and the outer portion and into the intermediate portion no further than a radial mid-point between the inner diameter and the outer diameter of the annular body.

In some embodiments, the annular body further has a curved profile in a radial direction, the curved profile defined at least by the intermediate portion, the curved profile of the annular body defining an apex, and the at least one cut extends radially no further than the apex.

In some embodiments, the curved profile in the radial direction is C-shaped.

In some embodiments, the curved profile in the radial direction is J-shaped.

In some embodiments, the at least one cut is defined at least on the outer portion of the annular body, and the at least one cut extends radially from the outer portion toward the inner portion beyond the outer contact sealing portion.

In some embodiments, the at least one cut is parallel to the central axis.

In some embodiments, the at least one cut is skewed relative to the central axis.

In some embodiments, the at least one cut is curved in a circumferential direction of the annular body.

In some embodiments, the at least one cut is V-shaped.

In some embodiments, the seal further includes an anti-friction coating applied at least to the outer portion of the annular body.

In some embodiments, when the seal is received between the inner and outer cylindrical components, the inner portion maintains a static position relative to the inner cylindrical component.

In some embodiments, the seal is received between the inner and outer cylindrical components in the absence of lubricant.

In some embodiments, the seal is part of a hot air system of a compressor section of the aircraft engine.

In some embodiments, the annular body is made of a metallic material sheet stock.

In some embodiments, the at least one cut includes a plurality of cuts spaced in a circumferential direction of the annular body.

In another aspect, there is provided a method for sealing a radial spacing between inner and outer cylindrical components in an aircraft engine, including disposing in interference fit in the radial spacing a seal including an annular body having an inner portion and an outer portion, one of the inner portion and the outer portion defining at least one cut extending from the one of the inner portion and the outer portion toward the other one of the inner portion and the outer portion, maintaining the inner portion in a static position relative to the inner cylindrical component; and slidably engaging the outer portion to the outer cylindrical component.

In some embodiments, prior to the disposing in interference fit in the radial spacing of the seal, applying an anti-friction coating at least to the outer portion of the annular body.

In some embodiments, the one of the inner portion and the outer portion defining the at least one cut is the outer portion.

DESCRIPTION OF THE DRAWINGS

Reference is now made to the accompanying figures in which:

FIG. 3 is a perspective view of a seal of the hot air system of FIG. 2;

FIG. 4 is a close-up, cross sectional view of portion S of FIG. 2;

FIG. 5 is a perspective view of another embodiment of a seal of the hot air system of FIG. 2; and FIG. 6 is a diagram showing a method for sealing a radial spacing between inner and outer cylindrical components in an aircraft engine.

DETAILED DESCRIPTION

Figure 1:
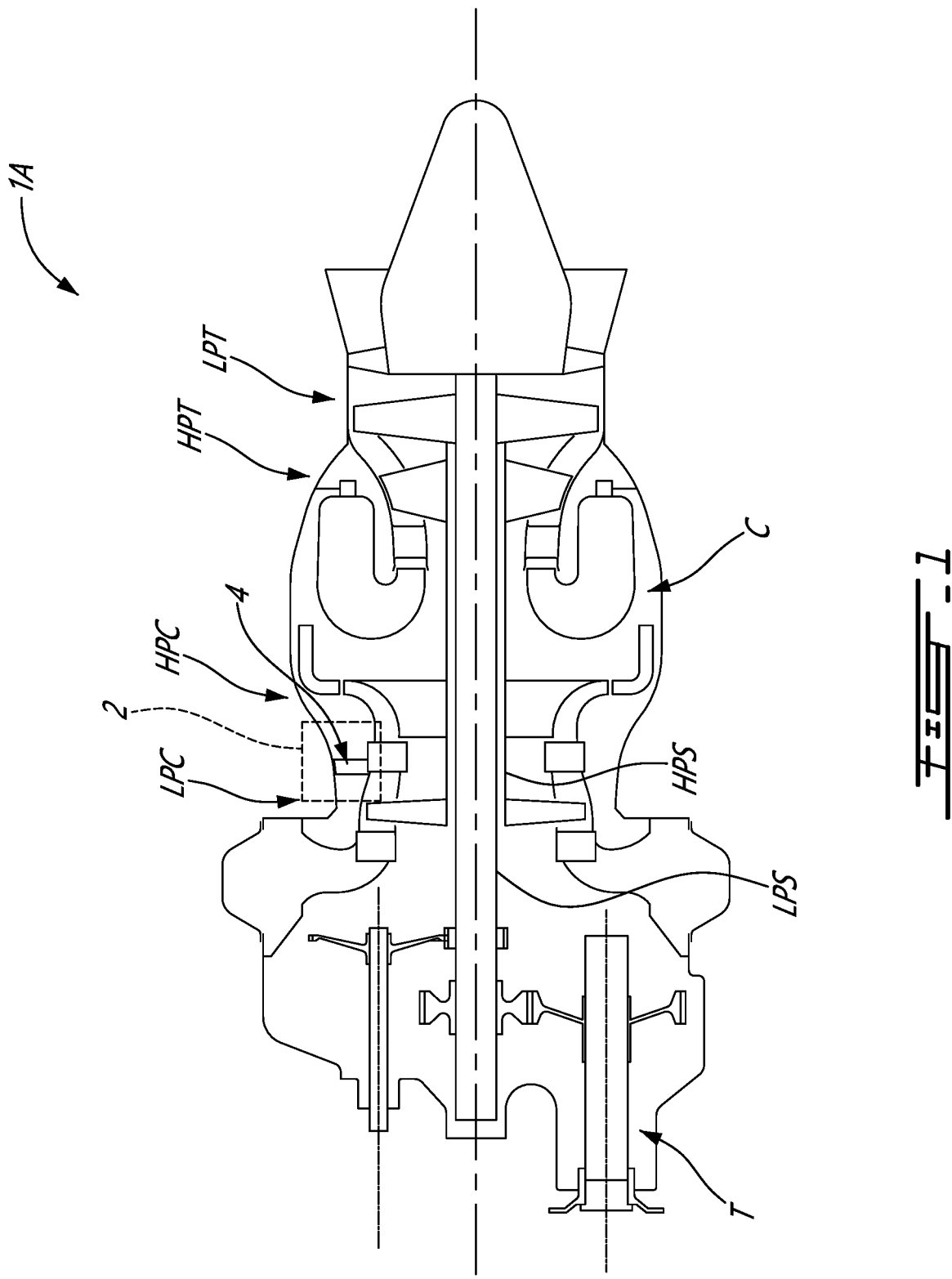
FIG. 1 is a schematic cross sectional view of an aircraft engine.

FIG. 1 illustrates an aircraft engine 1A, which may be part of an aircraft. In this example, the engine 1A is a turboshaft engine 1A, but could be any other type of aircraft engine. In this embodiment, the engine 1A includes in serial flow communication a low pressure compressor section (LPC) and a high pressure compressor section (HPC) for pressurizing air, a combustor (C) in which the compressed air is mixed with fuel and ignited for generating an annular stream of hot combustion gases, a high pressure turbine section (HPT), and a lower pressure turbine section (LPT). The respective pairs of the compressor and turbine sections are interconnected via respective independently rotatable low pressure and high pressure spools (LPS), (HPS). The engine 1A includes a transmission (T) driven by the low pressure turbine section (LPT) for outputting motive power to an aircraft.

A region 2 is schematically shown in FIG. 1. The region 2 includes a portion of a hot air system 4 (schematically shown in FIG. 1) conducting hot air from the low pressure compressor section (LPC) and/or high pressure compressor section (HPC) to other systems, either within the aircraft engine 1 or external thereto. For example, some components of hot air system 4 conduct hot air from the low pressure compressor section (LPC) to the cabin of the aircraft to supply hot/warm air inside the cabin (customer air).

Figure 2:
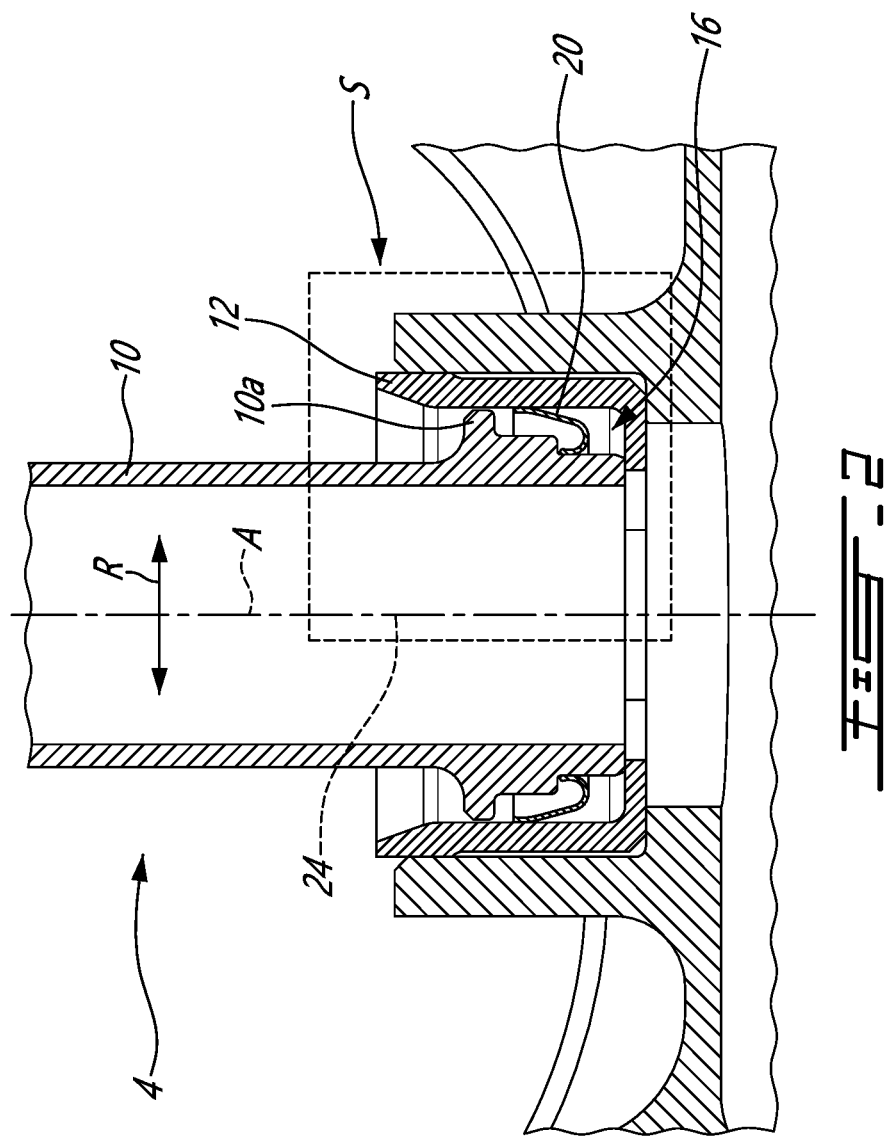
FIG. 2 is a cross sectional view of a portion of a hot air system of the aircraft engine of FIG. 1.

Referring to FIG. 2, a portion of the hot air system 4 is illustrated. To clearly describe the present technology, it is often required to describe components and features that are at differing radial, axial and/or circumferential positions. As shown in FIG. 2, the "A" axis represents an axial orientation. As used herein, the terms "axial" and/or "axially" refer to the relative position/direction of objects along axis A. As further used herein, the terms "radial" and/or "radially" refer to the relative position or direction of objects along a direction "R", which intersects axis A at only one location. In some embodiments, axis R is substantially perpendicular to axis A. Finally, the term "circumferential" refers to movement or position around axis A (e.g., direction "C" in FIG. 3). The term "circumferential" may refer to a dimension extending around a center of a respective object.

Still referring to FIG. 2, the hot air system 4 includes an inner cylindrical component 10 and an outer cylindrical component 12. More particularly, the components 10, 12 are adjacent to one another, and are coaxial about the axis A. In the present embodiment, the inner cylindrical component 10 is a transfer tube, and the outer cylindrical component 12 is a sleeve. The inner and outer cylindrical components 10, 12 are made of a metallic material suitable for the requirements of the hot air system 4. In the present embodiment, the cylindrical components 10, 12 are made of a nickel-chromium based alloy. The inner cylindrical component 10 conducts hot air, and both the inner and outer cylindrical components 10, 12 are subject to thermal expansion when the aircraft engine 1 is operated. The configuration, size and shape of the inner and outer cylindrical components 10, 12 could vary in other portions of the hot air system 4.

With reference to FIGS. 2 and 4, a radial spacing 16 is defined between the inner cylindrical component 10 and the outer cylindrical component 12 along the direction R. A flange is defined on the inner cylindrical component 10, and projects radially toward the outer cylindrical component 12. A gap 10b is defined between the flange 10a and the outer cylindrical component 12. A seat 10c is also defined by the inner cylindrical component 10. The seat 10c is axially offset from the flange 10a. A seal 20 is disposed in the radial spacing 16 to span across the radial spacing 16. The seal 20 is axially offset from the flange 10a. The seal 20, together with the flange 10a, limit leakage of hot air through the radial spacing 16.

Referring to FIGS. 2 to 4, the seal 20 has an annular body 22 that is received in interference fit in the radial spacing 16. The seal 20 is made of a metallic material, and is manufactured using metallic material sheet stock. It is contemplated that the seal 20 could be manufactured using a different technique, or combination of techniques. In the present embodiment, the metallic material sheet stock is made of a nickel-based alloy. Other metallic materials could be used in other embodiments.

The annular body 22 defines a central axis 24 that is coaxial with the axis A when the seal 20 is received in the radial spacing 16. The annular body 22 includes an inner portion 30 defining an inner diameter 32 of the seal 20. The inner portion 30 engages the seat 10c of the inner cylindrical component 10. The inner portion 30 is also shaped and dimensioned to maintain a static position relative to the inner cylindrical component 10 by interference fit. In other embodiments, the inner portion 30 could be sized and configured to slidably engage the inner cylindrical component 10 at least in some circumstances.

The annular body 22 further has an intermediate portion 40 extending radially outwardly from the inner portion 30. Referring to FIG. 4, the intermediate portion 40 defines at least partially a curved profile in the radial direction R. More particularly, the curved profile is J-shaped. The seal 20 is thus also referred to as a J-seal. The intermediate portion 40 defines an apex 42.

The annular body 22 further has an outer portion 50 defining an outer diameter 52 of the seal 20. An outer contact sealing portion 54 is defined by the outer portion 50 and the intermediate portion 40. The outer contact sealing portion 54 is a relatively narrow portion defined by the outer portion 50 and the intermediate portion 40, and is also referred to as the line contact sealing point. The outer contact sealing portion 54 could be defined only by the outer portion 50 in other embodiments. The outer contact sealing portion 54 is slidably engaged to the outer cylindrical component 12 when the seal 20 is received in the radial spacing 16. The sliding engagement of the outer contact sealing portion 54 accommodates radial and/or axial misalignment of the seal 20 that may occur as a result of thermal expansion and/or movement of the cylindrical component 12, and to maintain contact of the outer contact sealing portion 54 with the cylindrical component 12. As the inner portion 30 maintains a static position relative to the inner cylindrical component 10 and the outer contact sealing portion 54 is slidably engaged to the outer cylindrical component 12, the seal 20 is less subjected to vibrations during operation of the engine 1A and there is a reduced risk of fretting at the contact surfaces defined by the inner portion 30 and outer portion 50.

Referring to FIGS. 3 and 4, a plurality of cuts 60 is defined on the outer portion 50. The cuts 60 can be defined using any suitable method to provide cuts as narrow as possible (i.e. water jet, wire EDM, band saw, laser cut). Although four cuts 60 are shown in FIG. 3, there could be one, two, three, or more than four cuts 60 defined on the outer portion 50 of the annular body 22 of the seal 20. When more than one cut 60 is defined, the cuts 60 may be spaced from one another in the circumferential direction C (FIG. 3), whether uniformly or not.

Each cut 60 extends from the outer portion 50 toward the inner portion 30. Put differently, each cut 60 extends radially from the outer diameter 52 toward the inner diameter 32. Each cut 60 extends radially from the outer portion 50 toward the inner portion 30 and into the intermediate portion 40 no further than a radial mid-point 62 (FIG. 4) located between the inner diameter 32 and the outer diameter 52. In addition, each cut 60 extends radially no further than the apex 42 (FIG. 4). Each cut 60 extends radially from the outer portion 50 toward the inner portion 30 beyond the outer contact sealing portion 54. Each cut 60 extend parallel to the central axis 24, but it is contemplated that the cuts 60 could extend otherwise in other embodiments, and/or could extend differently from one another.

The cuts 60 form flexible fingers 64 in the outer portion 50, which ensure that the seal 20 has sufficient flexibility to conform to variations in the radial spacing 16 between the inner and outer cylindrical components 10, 12. Moreover, the cuts 60 in the outer portion 50 also accommodate radial and/or axial misalignment of the seal 20 that may occur as a result of misalignment of the inner cylindrical component 10 or thermal expansion. In addition, the cuts 60 bias the friction loads applied to the seal 20 toward the inner portion 30 and promote sliding of the outer portion 50 with the outer cylindrical component 12. Furthermore, the cuts 60 reduce the hoop stress resulting from the manufacturing of the seal 20. In some embodiments, the reduction in hoop stress reduces contact loads and therefore reduces friction in order to bias the sliding of the outer portion 50 with the outer cylindrical component 12. In other words, the cuts 60 further reduce the interference fit and the friction loads between the outer portion 50 and the outer cylindrical component 12. The reduction in friction loads between the outer portion 50 and the outer cylindrical component 12 promotes the sliding of the outer portion 50 against the inner surface of the outer cylindrical component 12. Put differently, the cuts 60 bias the friction loads applied to the seal 20 to be higher at the inner portion 30 than at the outer portion 50 thereof, while providing a good fit, good seal and long service life.

In order to increase the service life of the seal 20, an anti-friction coating 66 (FIG. 3) is applied to the outer portion 50 of the annular body 22 of the seal 20. In some embodiments, the anti-friction coating 66 is also applied to the intermediate portion 40 and/or the inner portion 30. The anti-friction coating 66 is a wear resistant coating applied using physical vapor deposition (PVD) techniques. The anti-friction coating 66 is an aluminium-titanium-nitride-based coating. Other anti-friction coatings could be used in other embodiments. It is also contemplated that the inner cylindrical component 10 and/or the outer cylindrical component 12 could be provided with the anti-friction coating 66 while the seal 20 may (or not) have the anti-friction coating 66 applied thereto. In some embodiments, the anti-friction coating 66 is applied only to the surfaces of the seal 20, inner cylindrical component 10, and outer cylindrical component 12 that are in sliding engagement with one another.

As the seal 20 is part of the hot air system 4 of the aircraft engine 1, the seal 20 described herein is intended to be received between the inner cylindrical component 10 and the outer cylindrical component 12 in the absence of lubricant. The seal 20 is also intended to reduce leakage of air between adjacent components of the hot air system 4, and is therefore not intended to contain a liquid or reduce leakage of a liquid, such as fuel, oil, or water. Although the seal 20 described herein is intended to be part of the hot air system 4, it is contemplated that seals in accordance with the present technology could be used in other systems where there are high temperatures environments beyond the capabilities of an elastomeric O-ring.

Referring now to FIG. 5, a seal 120 being another embodiment of the present technology will be briefly described. The seal 120 includes features that are the same as or similar to those of the seal 20. Therefore, for simplicity, features of the seal 120 that are the same as or similar to those of the seal 20 have been labeled with the same reference numerals, but in the 100 series (for example, inner portion 30 corresponds to inner portion 130), and will not be described again in detail.

The seal 120 has a curved profile that is C-shaped. The seal 120 is thus also referred to as a C-seal. Cuts 160a, 160b, 160c, 160d are defined on the outer portion 150 of the seal 120. The cut 160a is skewed relative to the central axis 124. The cut 160b is curved in the circumferential direction C. The cut 160c is V-shaped, and defines a chevron in the outer portion 150 of the seal 120. The cut 160d includes a rounded portion 162d at the innermost portion thereof to reduce local stress. The rounded portion 162d is wider than the cut 160d, and is intended to act as a local stress reduction feature, for example capable of mitigating crack propagation from the cut 160d into the seal 120. The cuts 160a, 160b, 160c, 160d are examples of different configurations of cuts that can be defined on the outer portion 150 of the seal 120. The amount of cuts, and their respective width, length and configuration can be selected depending on the desired reduction of hoop stress to be provided to the outer portion 150, and/or on the flexibility of the seal 120 to conform to variations in the radial spacing 16 between the inner and outer cylindrical components 10, 12.

With the above structure in mind, and now referring to FIG. 6, the present technology provides for a method 200 for sealing a radial spacing 16 between inner and outer cylindrical components 10, 12 in an aircraft engine 1. The method 200 includes at step 204 of disposing in interference fit in the radial spacing 16 a seal 20 including an annular body 22 having an inner portion 30 and an outer portion 50. One of the inner portion 30 and the outer portion 50 defines at least one cut 60 extending from the one of the inner portion 30 and the outer portion 50 toward the other one of the inner portion 30 and the outer portion 50. Also as seen with the structure above, in some embodiments, the method 200 may also include a step 206 of maintaining the inner portion 30 in a static position relative to the inner cylindrical component 10. The step 204 may be performed by engaging the inner portion 30 with a seat 10c defined by the inner cylindrical component 10. The step 204 could be performed otherwise in other embodiments. The method 200 may also include a step 208 of slidably engaging the outer portion 50 to the outer cylindrical component 12, such that the outer portion 50 accommodates radial and/or axial misalignment of the seal 20 that may occur as a result of, for example, thermal expansion, while increasing the service life of the seal 20. The method 200 may further include optional step 202 (shown in a dashed line box) of applying an anti-friction coating 66 at least to the outer portion 50 of the annular body 22 of the seal 20 prior to the step 202.

The above description is meant to be exemplary only, and one skilled in the art will recognize that changes may be made to the embodiments described without departing from the scope of the technology disclosed herein. Still other modifications which fall within the scope of the present technology will be apparent to those skilled in the art, in light of a review of this disclosure, and such modifications are intended to fall within the appended claims.

The invention claimed is:

1. A seal for an aircraft engine, comprising:
an annular body receivable in interference fit in a radial spacing defined between an inner cylindrical component and an outer cylindrical component of the aircraft engine, the annular body defining a central axis for being coaxial with the inner cylindrical component and the outer cylindrical component;
the annular body including an inner portion defining an inner diameter, an outer portion defining an outer diameter, and an intermediate portion extending between the inner and outer portions;
only one of the inner portion and the outer portion of the annular body having at least one cut extending therethrough and defining a contact sealing portion configured to be slidably engageable with a first respective one of the inner cylindrical component and the outer cylindrical component, wherein the at least one cut in said one of the inner portion and the outer portion extends radially from an end of said one of the inner portion and the outer portion toward the other of the inner portion and the outer portion beyond the contact sealing portion of the annular body; and the other of the inner portion and the outer portion being free of cuts therein and configured to remain in static position relative to a second respective one of the inner cylindrical component and the outer cylindrical component;

wherein the seal is part of a seal assembly, the seal assembly including the inner and outer cylindrical components of the aircraft engine, the inner and outer components forming part of a hot air system of a compressor section of the aircraft engine.

2. The seal of claim 1, wherein the outer contact sealing portion of the annular body is defined at least by the outer portion.

3. The seal of claim 1, wherein the at least one cut extends radially from the one of the inner portion and the outer portion toward the other one of the inner portion and the outer portion and into the intermediate portion no further than a radial mid-point between the inner diameter and the outer diameter of the annular body.

4. The seal of claim 1, wherein the annular body further has a curved profile in a radial direction, the curved profile defined at least by the intermediate portion, the curved profile of the annular body defining an apex, and the at least one cut extends radially no further than the apex.

5. The seal of claim 4, wherein the curved profile in the radial direction is C-shaped.

6. The seal of claim 4, wherein the curved profile in the radial direction is J-shaped.

7. The seal of claim 1, wherein the at least one cut is parallel to the central axis.

8. The seal of claim 1, wherein the at least one cut is skewed relative to the central axis.

9. The seal of claim 1, wherein the at least one cut is curved in a circumferential direction of the annular body.

10. The seal of claim 1, wherein the at least one cut is V-shaped.

11. The seal of claim 1, further comprising an anti-friction coating applied at least to the outer portion of the annular body.

12. The seal of claim 1, wherein, when the seal is received between the inner and outer cylindrical components, the inner portion maintains a static position relative to the inner cylindrical component.

13. The seal of claim 1, wherein the seal is configured to be received between the inner and outer cylindrical components in the absence of lubricant.

14. The seal of claim 1, wherein the annular body is made of a metallic material sheet stock.

15. The seal of claim 1, wherein the at least one cut includes a plurality of cuts spaced in a circumferential direction of the annular body.

16. A seal for an aircraft engine, comprising:

an annular body receivable in interference fit in a radial spacing defined between an inner cylindrical component and an outer cylindrical component of the aircraft engine, the annular body defining a central axis for being coaxial with the inner cylindrical component and the outer cylindrical component;

the annular body including an inner portion defining an inner diameter, an outer portion defining an outer diameter, and an intermediate portion extending between the inner and outer portions;

only one of the inner portion and the outer portion of the annular body having at least one cut extending therethrough and defining a contact sealing portion configured to be slidably engageable with a first respective one of the inner cylindrical component and the outer cylindrical component, wherein the at least one cut in said one of the inner portion and the outer portion extends radially from an end of said one of the inner portion and the outer portion toward the other of the inner portion and the outer portion beyond the contact sealing portion of the annular body; and wherein the at least one cut is defined on the outer portion of the annular body and interrupts the outer diameter, the inner portion being free of cuts therein and configured to remain in static position relative to a second respective one of the inner cylindrical component and the outer cylindrical component.

17. A method for sealing a radial spacing between inner and outer cylindrical components in an aircraft engine, comprising:

disposing in interference fit in the radial spacing a seal including an annular body having an inner portion and an outer portion, only one of the inner portion and the outer portion defining at least one cut therein, the at least one cut extending from the one of the inner portion and the outer portion toward the other one of the inner portion and the outer portion, wherein the one of the inner portion and the outer portion defining the at least one cut is the outer portion and the inner portion is free of cuts;

maintaining the other one of the inner portion and the outer portion in a static position relative to a respective one of the inner cylindrical component and the outer cylindrical component; and slidably engaging the one of the inner portion and the outer portion having the at least one cut therein with a respective one of the inner cylindrical component and the outer cylindrical component.

18. The method of claim 17, wherein, prior to the disposing in interference fit in the radial spacing of the seal, applying an anti-friction coating at least to the outer portion of the annular body.

* * * * *